(12) United States Patent
Thirumalai

(10) Patent No.: US 11,509,897 B2
(45) Date of Patent: Nov. 22, 2022

(54) COMPRESSION WITH POSITIVE RECONSTRUCTION ERROR

(71) Applicant: Samsung Display Co., Ltd., Yongin-si (KR)

(72) Inventor: Vijayaraghavan Thirumalai, Fremont, CA (US)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/070,898

(22) Filed: Oct. 14, 2020

(65) Prior Publication Data

US 2022/0046243 A1    Feb. 10, 2022

Related U.S. Application Data

(60) Provisional application No. 63/063,004, filed on Aug. 7, 2020, provisional application No. 63/062,963, filed on Aug. 7, 2020.

(51) Int. Cl.
*H04N 19/13* (2014.01)
*H04N 19/52* (2014.01)
*H04N 19/124* (2014.01)

(52) U.S. Cl.
CPC ........... *H04N 19/13* (2014.11); *H04N 19/124* (2014.11); *H04N 19/52* (2014.11)

(58) Field of Classification Search
CPC ....... H04N 19/13; H04N 19/124; H04N 19/52
See application file for complete search history.

(56) References Cited

U.S. PATENT DOCUMENTS

| 4,121,298 | A | * | 10/1978 | Akushsky | ............... G06F 7/729 708/491 |
|---|---|---|---|---|---|
| 5,491,479 | A | | 2/1996 | Wilkinson | |
| 6,324,216 | B1 | | 11/2001 | Igarashi et al. | |
| 8,411,975 | B2 | | 4/2013 | Lee et al. | |
| 8,447,121 | B2 | | 5/2013 | Shen et al. | |
| 9,143,791 | B2 | | 9/2015 | Park et al. | |

(Continued)

FOREIGN PATENT DOCUMENTS

| CN | 109712583 A | 5/2019 |
|---|---|---|
| EP | 1320266 A2 | 6/2003 |
| WO | WO 2002/037859 A3 | 5/2002 |

OTHER PUBLICATIONS

Wells, Joshua W., Error Resilient Video Encoding Using Block-Frame Checksums, 2010 IEEE 16th International On-Line Testing Symposium, Corfu, 2010, pp. 289-294, doi: 10.1109/IOLTS.2010.5560186.

(Continued)

*Primary Examiner* — Joseph Suh
(74) *Attorney, Agent, or Firm* — Lewis Roca Rothgerber Christie LLP

(57) ABSTRACT

A method of compressing a frame in an image compression and storage system, the method including applying a modulo addition to a residue of an original sample of the frame to generate a biased residue based on a bit depth of the original sample and a maximum allowed error, quantizing the biased residue based on the maximum allowed error to generate a quantized biased residue, and encoding a value corresponding to the quantized biased residue to generate an encoded value that has a non-negative reconstruction error.

19 Claims, 15 Drawing Sheets

(56) References Cited

U.S. PATENT DOCUMENTS

| | | | |
|---|---|---|---|
| 9,319,684 B2 | 4/2016 | Karczewicz et al. | |
| 10,645,386 B1 | 5/2020 | Ihara et al. | |
| 2003/0103572 A1* | 6/2003 | Lee | H04N 19/587 |
| | | | 375/E7.199 |
| 2003/0147470 A1 | 8/2003 | Lee et al. | |
| 2006/0245495 A1 | 11/2006 | Han et al. | |
| 2009/0067495 A1 | 3/2009 | Au et al. | |
| 2010/0146027 A1* | 6/2010 | Dao | G06F 11/08 |
| | | | 708/491 |
| 2010/0278232 A1* | 11/2010 | Yea | H04N 19/182 |
| | | | 382/233 |
| 2010/0322308 A1 | 12/2010 | Lee et al. | |
| 2012/0057630 A1 | 3/2012 | Saxena et al. | |
| 2012/0106644 A1 | 5/2012 | Henry et al. | |
| 2013/0114730 A1 | 5/2013 | Joshi et al. | |
| 2014/0050271 A1 | 2/2014 | Su et al. | |
| 2015/0003707 A1 | 1/2015 | Amon et al. | |
| 2015/0016542 A1 | 1/2015 | Rosewarne et al. | |
| 2015/0106414 A1* | 4/2015 | Olsen | H03M 7/18 |
| | | | 708/204 |
| 2015/0264404 A1 | 9/2015 | Hannuksela | |
| 2015/0276953 A1* | 10/2015 | Espana Palomares | |
| | | | G01T 7/005 |
| | | | 702/104 |
| 2015/0341652 A1* | 11/2015 | Sun | H04N 19/105 |
| | | | 382/233 |
| 2016/0029034 A1* | 1/2016 | Gu | H04N 19/14 |
| | | | 375/240.12 |
| 2016/0150230 A1 | 5/2016 | He | |
| 2017/0359589 A1 | 12/2017 | Stolt | |
| 2018/0020240 A1 | 1/2018 | Han et al. | |
| 2018/0091817 A1 | 3/2018 | Sole et al. | |
| 2018/0213244 A1* | 7/2018 | Cook | H04N 19/593 |
| 2019/0265952 A1* | 8/2019 | Peng | G02B 6/3596 |
| 2019/0333250 A1 | 10/2019 | Kunze et al. | |
| 2020/0092545 A1 | 3/2020 | Xu et al. | |
| 2020/0204800 A1* | 6/2020 | Hu | H04N 19/82 |
| 2021/0012208 A1* | 1/2021 | Folliot | G06N 3/0481 |
| 2021/0051333 A1* | 2/2021 | Zhao | H04N 19/176 |

OTHER PUBLICATIONS

Digital Image Processing, Unit V, Image Compression, Definition of image compression and redundancies in a digit image; Jun. 19, 2020, http://www.cmrcet.ac.in/assets/downloads/ececoursefile/17.pdf, CMR College of Engineering & Technology, 17 pages.

Niu, Y., et al., Image enhancement by entropy maximization and quantization resolution up conversion, Aug. 8, 2016, IEEE Transactions on Image Processing. Aug. 8, 2016; 25(10):4815-28, pp. 4047-4051.

Compression and Coding, Theory and Applications, 90 pages.

EPO Extended European Search Report dated Oct. 12, 2021, issued in corresponding European Patent Application No. 21174842.1 (8 pages).

Notice of Allowance issued in related U.S. Appl. No. 17/070,893, dated Mar. 22, 2022, 10 pages.

C. H. Lu, et al (C. H. Lu and A. A. Acampora, "A DPCM system with modulo limiters," IEEE Global Telecommunications Conference and Exhibition. Communications for the Information Age, 1988, pp. 581-585 vol. 1, doi: 10.1109/GLOCOM.1988.25907.) (Year: 1988).

U.S. Office Action dated Feb. 4, 2022, issued in U.S. Appl. No. 17/070,893 (19 pages).

Notice of Allowance for U.S. Appl. No. 17/070,893 dated Jul. 18, 2022, 10 pages.

\* cited by examiner

| $e'$ | $R = Q[e']$ |
|---|---|
| $[-\delta, 0]$ | 0 |
| $[1, \delta+1]$ | $\delta+1$ |
| $[\delta+2, 2\delta+2]$ | $2\delta+2$ |
| $[2\delta+3, 3\delta+3]$ | $3\delta+3$ |

| e' | Band size | R = Q[e'] |
|---|---|---|
| [−2,0] | 2 | 0 |
| [1,3] | 2 | 3 |
| [4,6] | 2 | 6 |
| [7,9] | 2 | 9 |

Quantization error bounded by 2

FIG. 4C

| e' | Band size | R = Q[e'] |
|---|---|---|
| [−2,0] | 2 | 0 |
| [1,3] | 2 | 3 |
| [4,5] | 1 | 5 |
| [6,7] | 1 | 7 |

Quantization error bounded by 1

FIG. 4D

| Original value (x) | f(x) | x' | y = g(x') | Possible error y-x |
|---|---|---|---|---|
| 0 | 0 | 0, 1, 2 | 0, 1 | 0, 1 |
| 1 | 2 | 2, 3, 4 | 1, 2, 3 | 0, 1, 2 |
| 2 | 3 | 3, 4, 5 | 2, 3, 4 | 0, 1, 2 |
| 3 | 4 | 4, 5, 6 | 3, 4, 5 | 0, 1, 2 |
| 4 | 5 | 5, 6, 7 | 4, 5, 7 | 0, 1, 3 |
| 5 | 6 | 6, 7 | 5, 7 | 0, 2 |
| 6 | 7 | 7 | 7 | 1 |
| 7 | 7 | 7 | 7 | 0 |

Lower error at 0

FIG. 7B

| original value (x) | F(x) | x' | y = g(x') | Possible error y-x |
|---|---|---|---|---|
| 0 | 2 | 2, 3 | 0, 1 | 0, 1 |
| 1 | 3 | 3, 4 | 1, 2 | 0, 1 |
| 2 | 4 | 4, 5 | 2, 3 | 0, 1 |
| 3 | 5 | 5, 6 | 3, 5 | 0, 2 |
| 4 | 0 | 0, 1 | 4 | 0 |
| 5 | 6 | 6, 7 | 5, 7 | 0, 2 |
| 6 | 7 | 7 | 7 | 1 |
| 7 | 7 | 7 | 7 | 0 |

FIG. 8

| original value (x) | F(x) = 7-x | x' | y = g(x') | Possible error y-x |
|---|---|---|---|---|
| 0 | 7 | 7 | 0 | 0 |
| 1 | 6 | 6, 7 | 2, 0 | 1, -1 |
| 2 | 5 | 5, 6 | 3, 2 | 1, 0 |
| 3 | 4 | 4, 5 | 4, 3 | 1, 0 |
| 4 | 3 | 3, 4 | 5, 4 | 1, 0 |
| 5 | 2 | 2, 3 | 6, 5 | 1, 0 |
| 6 | 1 | 1, 2 | 7, 6 | 1, 0 |
| 7 | 0 | 0, 1 | 7 | 0 |

FIG. 9A

| original value (x) | F(x) | x' | y = g(x') | Possible error y-x |
|---|---|---|---|---|
| 0 | 7 | 7 | 0 | 0 |
| 1 | 0 | 0, 1 | 1, 2 | 1, 0 |
| 2 | 1 | 1, 2 | 2, 3 | 1, 0 |
| 3 | 2 | 2, 3 | 3, 4 | 1, 0 |
| 4 | 3 | 3, 4 | 4, 5 | 1, 0 |
| 5 | 4 | 4, 5 | 5, 6 | 1, 0 |
| 6 | 5 | 5, 6 | 6, 7 | 1, 0 |
| 7 | 5 | 5, 6 | 6, 7 | -1, 0 |

FIG. 9B

COMPRESSION WITH POSITIVE RECONSTRUCTION ERROR

CROSS-REFERENCE TO RELATED APPLICATION(S)

This application claims priority to, and the benefit of, U.S. Provisional Application No. 63/063,004 ("COMPRESSION WITH POSITIVE RECONSTRUCTION ERROR"), filed on Aug. 7, 2020, and U.S. Provisional Application No. 63/062,963 ("DPCM CODEC WITH HIGHER RECONSTRUCTION QUALITY ON IMPORTANT GRAY LEVELS"), filed on Aug. 7, 2020, the entire contents of which are incorporated herein by reference.

The present application is also related to U.S. Patent Application No. 17/070,893 entitled "DPCM CODEC WITH HIGHER RECONSTRUCTION QUALITY ON IMPORTANT GRAY LEVELS", filed Oct. 14, 2020, which claims priority to and the benefit of U.S. Provisional Patent Application Nos. 63/063,004 and 63/062,963, the entire contents of which are incorporated herein by reference.

FIELD

Aspects of embodiments of the present disclosure are generally related to image processing systems and methods.

BACKGROUND

Flat-panel displays, such as liquid crystal displays (LCDs) and light emitting diode (LED) displays, are becoming ubiquitous, due to their small size, superior image quality, and lower power consumption.

Pixels in a display panel have a particular response time. The data provided to a pixel to display may change faster than the pixel has the ability to respond. As such, undesirable effects such as motion blur or ghosting effects may occur. In order to make the displayed image more pleasing, image compensation technology is necessary. An overdrive algorithm has been developed that may compensate image data so as to reduce motion blur exhibited by the display pixels.

The above information disclosed in this Background section is only for enhancement of understanding of the present disclosure, and therefore it may contain information that does not form the prior art that is already known to a person of ordinary skill in the art.

SUMMARY

Aspects of embodiments of the present disclosure are directed to a system and method for image compression, storage, decompression capable of ensuring bounded and non-negative reconstruction error. In some embodiments, the system achieves this goal by, in part, encoding an image or frame using appropriate quantization band size and added bias. The system and method may improve the image compensation performance of an overdrive system.

Aspects of embodiments of the present disclosure are directed to a system and method for image compression, storage, decompression capable of ensuring zero reconstruction error for a particular high-priority gray value or at least lower reconstruction error for the particular high-priority gray value relative to other gray values.

According to some embodiments of the present invention, there is provided a method of compressing a frame in an image compression and storage system, the method including: applying a modulo addition to a residue of an original sample of the frame to generate a biased residue based on a bit depth of the original sample and a maximum allowed error; quantizing the biased residue based on the maximum allowed error to generate a quantized biased residue; and encoding a value corresponding to the quantized biased residue to generate an encoded value that has a non-negative reconstruction error.

In some embodiments, the applying the modulo addition to the residue includes calculating the biased residue as $$e' = \begin{cases} e & e \geq -\delta \\ e + 2^{bitdepth} + \delta & e < -\delta \end{cases}$$

where e' represents the biased residue, e represents the residue of the original sample, bitdepth represents the bit depth of the original sample, and δ represents the maximum allowed error, wherein the original sample corresponds to a color value of a pixel of the frame.

In some embodiments, the biased residue is within a range expressed as $-\delta \leq e' \leq 2^{bitdepth}-1$.

In some embodiments, the method further includes: receiving the original sample; and subtracting a prediction of a previous reconstructed sample from the original sample to generate the residue of the original sample.

In some embodiments, the value corresponding to the quantized biased residue is a quantization index corresponding to the quantized biased residue.

In some embodiments, the quantizing the biased residue is based on a quantization step size that is equal to the maximum allowed error plus 1.

In some embodiments, the quantizing the biased residue includes calculating a quantization index of the quantized biased residue as:

$$I[e'] = \text{Ceiling}\left(\frac{e'}{\delta+1}\right)$$

where I[e] represents the quantization index, Ceiling(.) represents a ceiling function, e' represents the biased residue, and δ represents the maximum allowed error.

In some embodiments, the quantizing the biased residue includes utilizing non-uniform quantization bands.

In some embodiments, the method further includes: performing inverse quantization on the quantized biased residue to generate a reconstructed biased residue; and adding a prediction of a previous reconstructed sample to the reconstructed biased residue to generate a reconstructed biased sample; applying a modulo subtraction and a clipping operation to the reconstructed biased sample based on the bit depth of the original sample and the maximum allowed error to generate a reconstructed sample; and generating the prediction of a subsequent reconstructed sample based on the reconstructed sample.

In some embodiments, the applying the modulo subtraction to the reconstructed biased sample includes calculating the reconstructed sample as:

$$y = x - (2^{bitdepth} + \delta)$$

where y represents the reconstructed sample, x represents the reconstructed biased sample, bitdepth represents the bit depth of the original sample, and δ represents the maximum allowed error.

In some embodiments, the performing inverse quantization is based on a quantization band size that is equal to the maximum allowed error and further based on a quantization index.

In some embodiments, the performing inverse quantization on the quantized biased residue includes calculating the reconstructed biased residue as $$Q[e'] = (\delta+1)I[e']$$

where Q(e') represents the reconstructed biased residue associated with the biased residue e', I[e'] represents a quantization index, and δ represents the maximum allowed error.

In some embodiments, the performing inverse quantization on the quantized biased residue is based on a non-uniform quantization table.

In some embodiments, the encoding the value corresponding to the quantized biased residue includes: performing entropy encoding on the value corresponding to the quantized biased residue to generate the encoded value.

In some embodiments, the method further includes: truncating the frame by reducing a bit depth of a color value of a pixel of the frame to generate the original sample, wherein the frame has a red, green, and blue (RGB) format or a red, green, blue, and green (RGBG) format.

According to some embodiments of the present invention, there is provided a method of decompressing stored image data corresponding to a frame in an image compression and storage system, the method including: decoding an encoded value corresponding to an original sample of the frame to generate a decoded value corresponding to a quantized biased residue; performing inverse quantization on the decoded value to generate a reconstructed biased residue; adding a prediction of a previous reconstructed sample to the reconstructed biased residue to generate a reconstructed biased sample; and applying a modulo subtraction to the reconstructed biased sample based on a bit depth of the original sample and a maximum allowed error to generate a reconstructed sample.

In some embodiments, the method further includes: generating the prediction of a subsequent reconstructed sample based on the reconstructed sample.

In some embodiments, the applying the modulo subtraction to the reconstructed biased sample includes calculating the reconstructed sample as:

$$y = x - (2^{bitdepth} + \delta)$$

where y represents the reconstructed sample, x represents the reconstructed biased sample, bitdepth represents the bit depth, and δ represents the maximum allowed error.

In some embodiments, the decoded value is a quantization index, and the performing inverse quantization on the decoded value includes calculating the reconstructed biased residue as $$Q[e'] = (\delta+1)I[e']$$

where Q(e') represents the reconstructed biased residue, I[e'] represents the quantization index, e' represents the biased residue, and δ represents the maximum allowed error.

According to some embodiments of the present invention, there is provided an image compression and storage system including: a processor; and a processor memory local to the processor, wherein the processor memory has stored thereon instructions that, when executed by the processor, cause the processor to perform: applying a modulo addition to a residue of an original sample of a frame to generate a biased residue based on a bit depth of the original sample and a maximum allowed error; quantizing, by the processor, the biased residue based on the maximum allowed error to generate a quantized biased residue; encoding a value corresponding to the quantized biased residue to generate an encoded value for storage in a storage medium; retrieving the encoded value from the storage medium; decoding the encoded value to generate a decoded value corresponding to a quantized biased residue; performing inverse quantization on the decoded value to generate a reconstructed biased residue; adding a prediction of a previous reconstructed sample to the reconstructed biased residue to generate a reconstructed biased sample; and applying a modulo subtraction to the reconstructed biased sample based on the bit depth of the original sample and the maximum allowed error to generate a reconstructed sample, wherein a difference between the original sample and the reconstructed sample is only non-negative.

BRIEF DESCRIPTION OF THE DRAWINGS

The accompanying drawings, together with the specification, illustrate example embodiments of the present disclosure, and, together with the description, serve to explain the principles of the present disclosure.

FIGS. 4C and 4D respectively illustrate uniform and non-uniform quantization tables utilized by the quantizer, according to some embodiments of the present disclosure.

FIGS. 7A-7B are tables illustrating numerical examples of the potential reconstruction errors for different sample values given different values of maximum error δ and constant c, according to some embodiments of the present disclosure.

FIG. 8 is a table illustrating a numerical example of the potential reconstruction errors for different sample values given the importance of a non-zero sample value, according to some embodiments of the present disclosure.

FIGS. 9A-9B are tables illustrating numerical examples of the potential reconstruction errors for different sample values based on the mapping and inverse mapping functions of an image compression and storage system that does not ensure non-negative reconstruction error, according to some embodiments of the present disclosure.

DETAILED DESCRIPTION

The detailed description set forth below is intended as a description of example embodiments of a system and method for image compression, storage, and decompression, provided in accordance with the present disclosure, and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Figure 1:
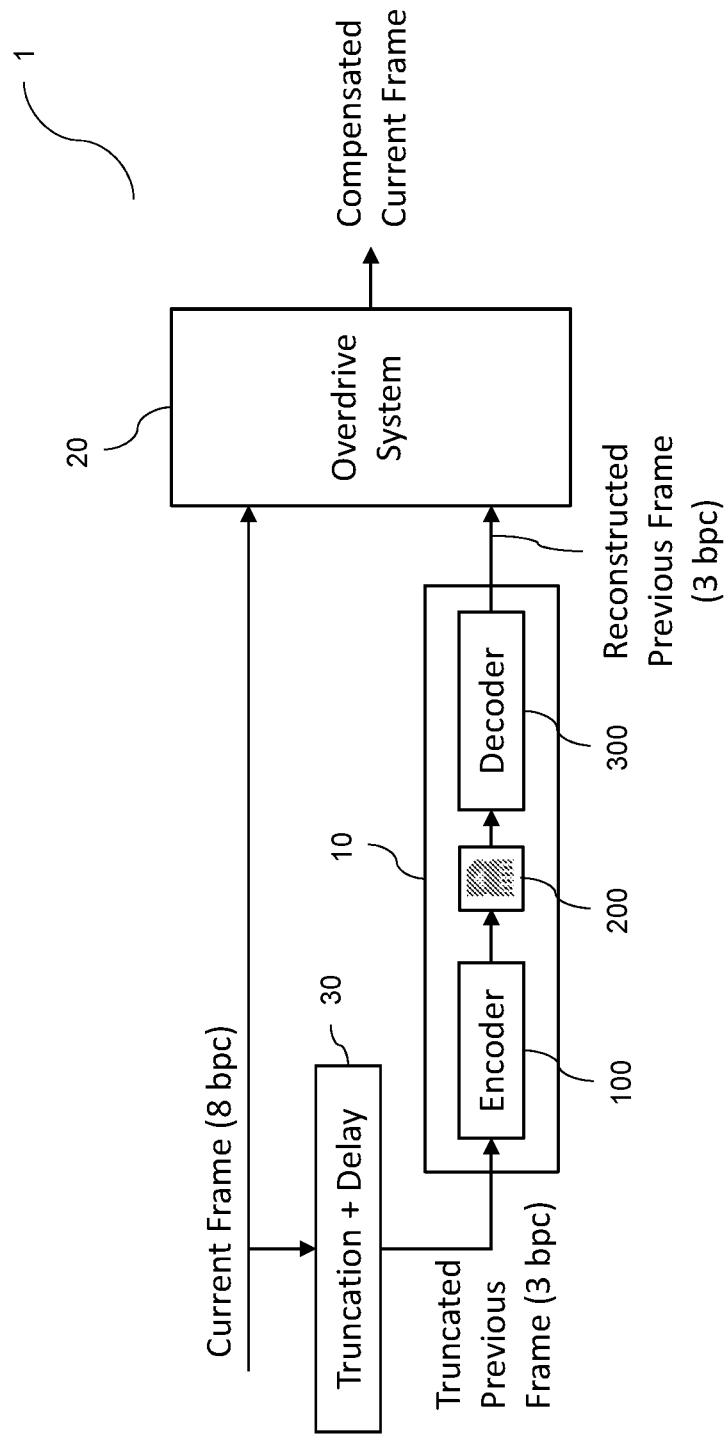
FIG. 1 is a schematic diagram of a frame compensation system utilizing an image compression and storage system, according to some embodiments of the present disclosure.

FIG. 1 is a schematic diagram of a frame compensation system 1 utilizing an image compression and storage system 10, according to some embodiments of the present disclosure.

In some embodiments, the image compression and storage system 10 includes an encoder 100 for encoding (e.g., compressing) data to reduce its size, a storage medium 200 for storing the encoded data, and a decoder 300 for decoding (e.g., decompressing) the stored data to reconstruct the data. Storage of certain data, such as 4K image frames, consumes a large amount of memory space. Here, the encoder 100 and decoder 300 allow for the use of a smaller storage medium 200, which can result in space and cost savings. As illustrated in FIG. 1, in some examples, the image compression and storage system 10 may form part of frame compensation system 1 in which an overdrive system 20 compensates the current frame (e.g., to reduce ghosting effect or blurring) using a previous frame. In some examples, a truncation and delay circuit 30 receives a frame (of, e.g., 8 bits per color (bpc)), truncates the frame (i.e., reduces the number of bpc of a pixel value of a frame, e.g., down to 3 bpc) and delays the frame to produce a truncated previous frame. The image compression and storage system 10 then compresses the previous frame and stores it for later consumption by the overdrive system 20. Here, the truncation and compression may make the stored frame significantly smaller in size than the original (previous) frame. For example, in the case of an RGB input frame, where each color value is represented with 8 bits (or 24 bits per pixel (bpp)), truncation may result in a frame representation of 3 bpc/9 bpp, and a 1.5:1 compression performed by the encoder 100 may further reduce this to 2 bpc/6 bpp. However, embodiments of the present disclosure are not limited to RGB input frames, and any suitable input frame format, such as RGBG (for pentile sub-pixel arrangements), may be used. For example, in the case of an RGBG input frame, the truncation may reduce the frame size from 16 bpp to 6 bpp, and a 1.5:1 compression performed by the encoder 100 can further reduce the size down to 4 bpp. Furthermore, embodiments of the present disclosure are not limited to using the truncation operation above and, in some examples, the truncation and delay circuit 30 may be replaced with a delay block and the truncation operation may be omitted from the process described herein.

The performance of the overdrive system 20 may improve if the reconstruction error, that is, the error introduced by the image compression and storage system 10 (all of which is quantization error) is only non-negative. The coding schemes of the related art typically optimize the mean square error (MSE) or peak signal to noise ratio (PSNR), which means that the polarity of the error in the reconstructed image can be both positive and negative. According to some embodiments, the image compression and storage system 10 improves the performance of the overdrive system 20 relative to the related art by ensuring that the reconstruction error (i.e., quantization error), which is defined as the difference between the reconstructed frame and the original frame, is always non-negative (i.e., greater than or equal to zero) and also is limited to a set maximum value.

Throughout this disclosure, a frame refers to data of an image frame, which includes a plurality of pixels. Each pixel of the frame may be represented with a number of color values (e.g., red, green, and blue).

Figure 2A:
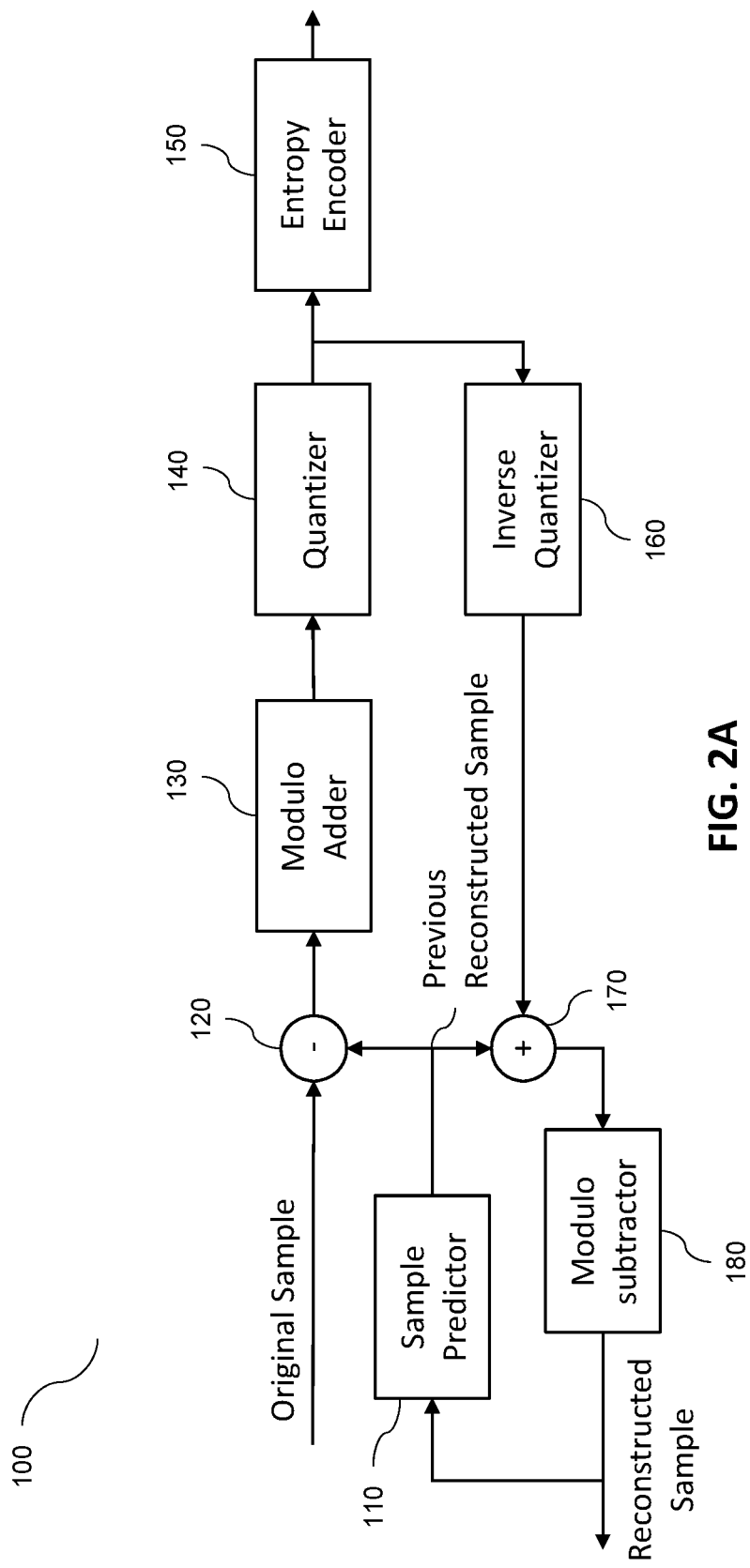
FIG. 2A is a schematic diagram of an encoder of the image compression and storage system, according to some embodiments of the present disclosure.
Figure 2B:
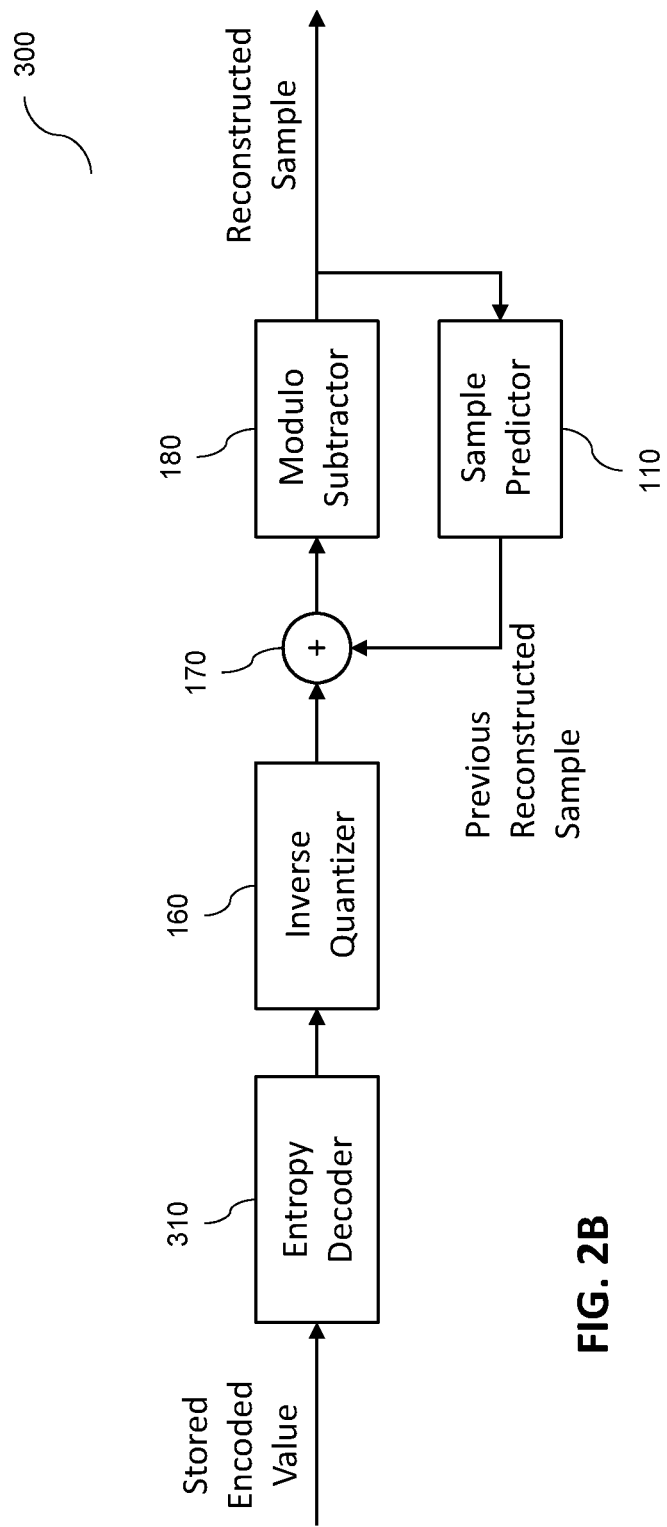
FIG. 2B is a schematic diagram of a decoder of the image compression and storage system, according to some embodiments of the present disclosure.

FIG. 2A is a schematic diagram of the encoder 100 of the image compression and storage system 10, according to some embodiments of the present disclosure. FIG. 2B is a schematic diagram of the decoder 300 of the image compression and storage system 10, according to some embodiments of the present disclosure.

Referring to FIG. 2A, according to some embodiments, the encoder 100 utilizes a predictive coding scheme in which a residual of the original sample (e.g., a truncated frame) is encoded, and not the original sample itself. The residual (also referred to as error e) is defined as the difference between the original sample and a prediction based on one or more neighboring samples (e.g., a prediction of the previous sample). In some embodiments, the sample predictor 110 generates a prediction of the previous sample and the subtractor 120 calculates the residual value based on the original and predicted samples. The calculated residue may be positive or negative value. The modulo adder 130 adds a bias value to the residue in order to reduce the signaling cost of 1-bit sign information. The quantizer 140 quantizes the biased residual value to generate a quantized biased value, and passes the corresponding quantization index to the entropy encoder 150 for further compression (e.g., lossless compression, such as entropy encoding). This compressed data (or encoded value) is stored in the storage medium 200. As will be explained further below, in some embodiments, the bias value is a function of the quantization step size.

According to some embodiments, to generate the predicted sample, the inverse quantizer 160 performs the inverse operation performed by the quantizer 140 on the quantized biased residue to generate a reconstructed biased residue, the adder 170 adds a prediction of a previous reconstructed sample to the reconstructed biased residue to generate a reconstructed biased sample, the modulo subtractor 180 subtracts the value added by the modulo adder 130 to generate a reconstructed sample. In some examples, a clipping function may be applied to the reconstructed sample to ensure that it is within a desired dynamic range, which may be expressed as $[0, 2^{bitDepth}-1]$ for a given bitdepth. This reconstructed sample (e.g., the clipped reconstructed sample) is used by the sample predictor 110 to predict the next sample.

Referring to FIG. 2B, in some embodiments, the decoder 300 includes an entropy decoder 310, which decompresses the stored sample received from the storage medium, and the same inverse quantizer 160, adder 170, modulo subtractor 180, and sample predictor 110 as described above. With the exception of the entropy decoder 310, the remaining components of the decoder 300 are same as those in the encoder 100 and configured in the same manner. As such, a detailed description thereof will not be repeated here for sake of brevity.

Because the decoder 300 does not have access to the original sample, and only the reconstructed sample, the sample predictor 110 of the decoder 300 uses the reconstructed sample to generate the prediction of the previous sample. Further, because the operations of the encoder 100 and 300 mirror one another, the sample predictor 110 of the encoder 100 also uses the same reconstructed sample to generate the prediction of the previous sample so that the encoder 100 can be in-sync with the decoder 300, even though the encoder 100 does have access to the original sample.

In some embodiments, the encoder 100 and decoder 300 operate on a single color value of a pixel. Accordingly, a plurality of encoders 100 and decoders 300 may operate in parallel (e.g., operate concurrently/simultaneously) to process the various colors of a pixel.

Figure 3A:
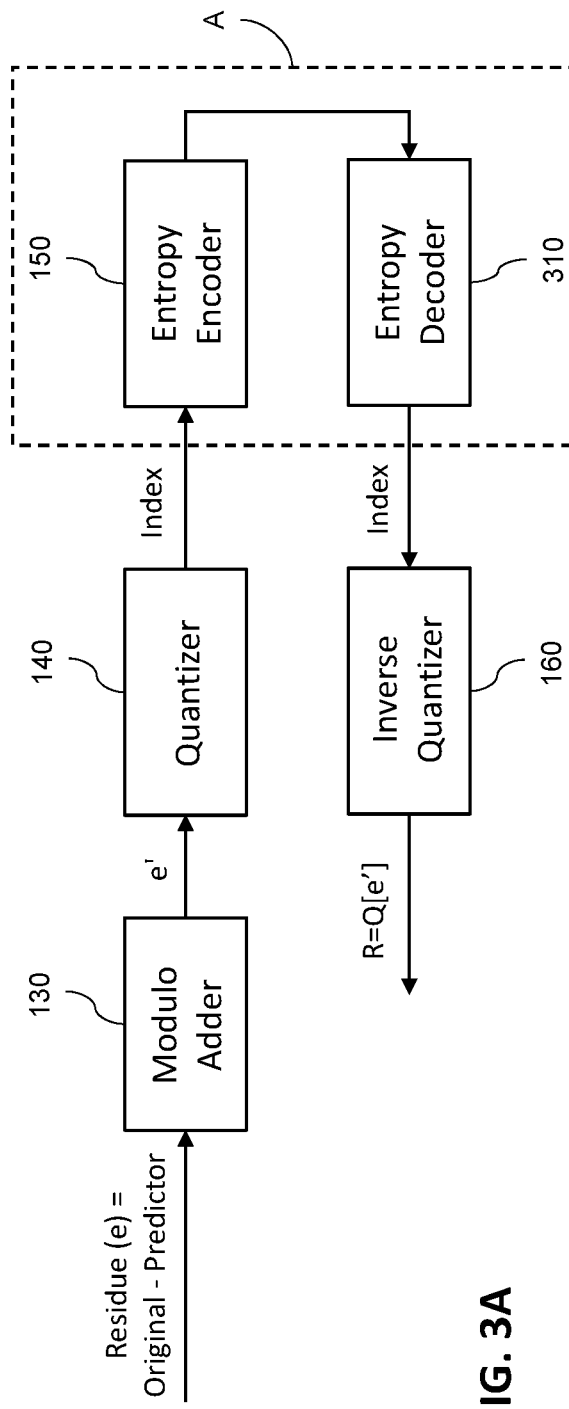
FIG. 3A is a schematic diagram illustrating a portion of the encoder together with a portion of the decoder, according to some embodiments of the present disclosure.
Figure 3B:
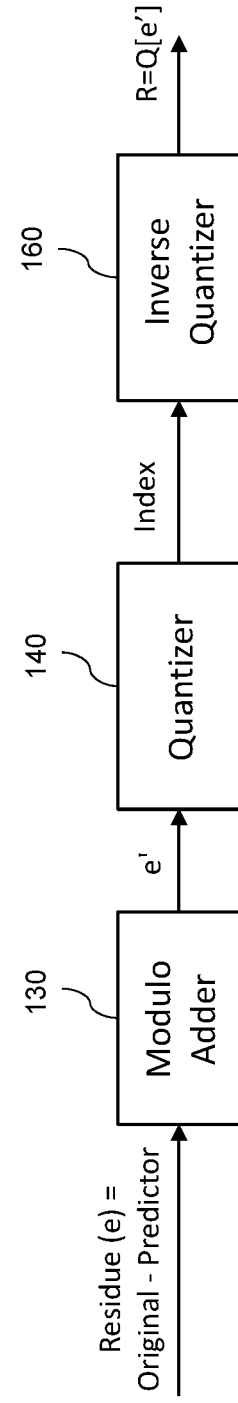
FIG. 3B is a simplified diagram of FIG. 3A, which accounts for the identity operation of the entropy coder and decoders, according to some embodiments of the present disclosure.

FIG. 3A is a schematic diagram illustrating a portion of the encoder together with a portion of the decoder, according to some embodiments of the present disclosure. FIG. 3B is a simplified diagram of FIG. 3A, which accounts for the identity operation of the entropy coder and decoders, according to some embodiments of the present disclosure.

According to some embodiments, the operations performed by the components of the encoder 100 and decoder 300, with the exception of the quantizer 140, are all loss-less operations. For example, the sequential operation of the entropy encoder 150 and entropy decoder 310 shown in FIG. 3A (as block A) is an identity operation, and can thus be effectively omitted, resulting in FIG. 3B. Therefore, the error in the signal space, which is defined as the difference between the reconstructed sample at the output of the decoder 300 and the original sample at the input of the encoder 100, is equivalent to the error in the residual space:

$$\text{Error(residual)} = R - e' = Q[e'] - e' \quad \text{Eq. (1)}$$

where e' is the biased residue that is input to the quantizer 140, R is the output of the inverse quantizer 160, and Q[.] is the combined quantization and inverse quantization function of the quantizer 140 and inverse quantizer 160.

Therefore, if the error in the residual space is maintained as non-negative, the error in the signal space will also be non-negative. Further, if the error in the residual space is bounded, that is if $R - e' \leq \delta$, where $\delta$ is a positive integer representing maximum allowable error, the error in the signal space will also be limited to $\delta$. This relation holds even in the presence of modulo adder 130 and subtractor 180. In contrast, the transform coding used in the related art (e.g., high efficiency video coding (HEVC), JPEG-2000, or VESA display compression-M (VDC-M)) may not be suitable for ensuring the non-negative reconstruction error, as positive error in the transformed domain does not ensure non-negative reconstruction error in the signal space. This may be due to the fact that transforms such as the discrete cosine transform (DCT) preserve the L2-norm (or energy) between the original and transformation coefficients but not the L1-norm.

Accordingly, in some embodiments, the modulo adder 130 and the quantizer 140 are configured in such a way as to ensure that the error in the residual space remains non-negative and is bounded (i.e., limited to $\delta$), which ensures the same in the signal space.

The quantizer 140 and inverse quantization 160 ensure a non-negative, bounded error by appropriately adjusting quantization band size and reconstruction points in each band. In some embodiments, given a maximum allowable error $\delta$, the quantizer 140 utilizes uniform or non-uniform quantization bands having a maximum quantization step size of $\delta+1$, and uses a reconstruction point at the right edge (i.e., maximum value) of the band. Further, in some embodiments, the value zero is at the right edge of a band (e.g., the first quantization band of index 1) so that zero appears in the reconstructed value. This may be due to the fact that the residues are peaked at zero.

Figures 4A, 4B:
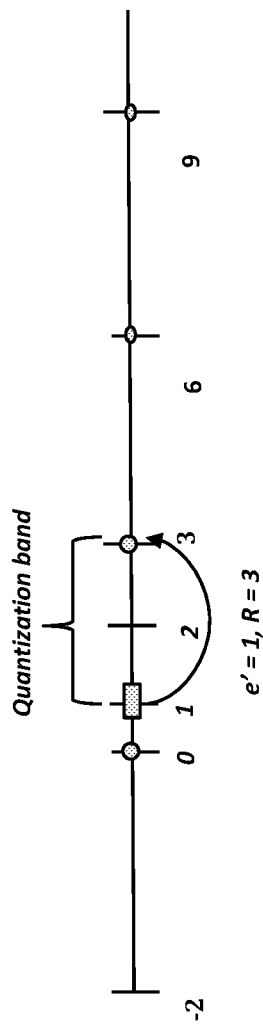
FIG. 4A illustrates a quantization table utilized by the quantizer, according to some embodiments of the present disclosure.
FIG. 4B illustrates the operation of the quantizer, according to some examples of the present disclosure.

FIG. 4A illustrates a quantization table utilized by the quantizer 140 and inverse quantization 160, according to some embodiments of the present disclosure. FIG. 4B illustrates the operation of the quantizer 140 and inverse quantization 160, the input is e' and output is R, according to some examples of the present disclosure. FIGS. 4C and 4D respectively illustrate uniform and non-uniform quantization tables utilized by the quantizer 140, according to some embodiments of the present disclosure.

Referring to FIG. 4A, the quantizer 140 uses uniform bands of quantization step size $\delta+1$ with reconstruction points at the right edge of each band. In some embodiments, the first quantization band has a right edge of zero (i.e., a reconstruction point of zero). Here, the biased residue e' are integers. In some embodiments, when using the modulo addition and subtraction parameters defined in Equations 6 and 8 (also referred to as optimized modulo addition and subtraction parameters), the number of bands NB may be expressed as $$NB = \text{ceiling}\left(\frac{2^{bitdepth} + \delta}{\delta + 1}\right) \quad \text{Eq. (2)}$$

where $\delta$ represents the maximum allowed error and Ceiling(.) represents a ceiling function. Here, $\delta+1$ may be the maximum allowable step size, i.e., smaller step sizes may be chosen. In some other embodiments, when using un-optimized modulo addition and subtraction parameters (i.e., parameters not defined by Equations 6 and 8), the number of bands NB may be expressed as $$NB = \text{ceiling}\left(\frac{2^{bitdepth} + 2\delta}{\delta + 1}\right) \quad \text{Eq. (3)}$$

In some embodiments, in quantizing the biased residue, the quantizer 140 calculates a quantization index of the biased residue as:

$$I[e'] = \text{Ceiling}\left(\frac{e'}{\delta + 1}\right) \quad \text{Eq. (4)}$$

where $-\delta \leq e' \leq 2^{bitdepth} - 1$, when using the optimized addition and subtraction parameters of Equations 6 and 8. Otherwise, $-\delta \leq e' \leq 2^{bitdepth} - 1 + \delta$, when using the unoptimized addition and subtraction parameters.

where I[e'] represents the quantization index, Ceiling(.) represents a ceiling function, e' represents the biased residue, and $\delta$ represents the maximum allowed error.

Similarly, performing inverse quantization on the quantized biased residue may include calculating the reconstructed biased residue as $$Q[e'] = (\delta+1)I[e'] \qquad \text{Eq. (5)}$$

where Q(e') represents the reconstructed biased residue, I[e'] represents the quantization index, and e' represents the biased residue. Equations 2 and 3 apply to embodiments utilizing uniform quantization. When using non-uniform quantization, the maximum step size may be δ+1.

FIG. 4B illustrates an example in which δ=2, and the bit depth (i.e., the number of bits per color) is 3. Here, bit depth refers to the color information stored in an image and affects the dynamic range of the image. The higher the bit depth of an image, the more colors it can store. The simplest image, a 1 bit image, can only show two colors, black and white. That is because the 1 bit can only store one of two values, 0 (white) and 1 (black). As bit depth increases so does the dynamic range, which increases the number of quantization bands.

As illustrated in the example of FIG. 4B, a biased residue e' of 1 results in a reconstruction value of 3.

According to some embodiments, the modulo adder 130 calculates the biased residue e' as:

$$e' = \begin{cases} e & e \geq -\delta \\ e + 2^{bitdepth} + \delta & e < -\delta \end{cases} \qquad \text{Eq. (6)}$$

This implies that the biased residue is within a range that can be expressed as:

$$-\delta \leq e' \leq 2^{bitdepth}-1 \qquad \text{Eq. (7)}$$

The upper limit of the biased residue e' allows for non-uniform quantization bands that can reduce error for certain biased values and thus improve performance.

For example, when δ=2, and bit depth=3, −2≤e'≤7, and the uniform quantization table shown in FIG. 4C and the non-uniform quantization table shown in FIG. 4D can be utilized by the quantizer 140. In FIG. 4C, in which uniform band size of 2 is used, the quantization error for all of the four bands is bounded by δ (i.e., 2). However, embodiments of the present disclosure also allow for the non-uniform bands of the quantization table shown in FIG. 4D, in which the third and fourth bands have a smaller quantization error that is bounded by 1 (and not 2). In some example, the quantizer 140 reserves the narrower bands for those bands that are more statistically significant (e.g., bands in which more of the biased residues lie, or bands of values whose values have a greater impact on the performance of the overdrive system 20). As such, the smaller quantization error enabled by the operation of the modulo adder may improve the performance of the overdrive system 20.

The modulo subtractor 180 may perform the opposite operation as the modulo adder 130 by removing the bias value added to the residue by the modulo adder 130. According to some embodiments, for a given input x, the output y of the modulo subtractor 180 is expressed as $$y = \begin{cases} x & x \leq 2^{bitdepth} + \delta - 1 \\ x - (2^{bitdepth} + \delta) & x > 2^{bitdepth} + \delta - 1 \end{cases} \qquad \text{Eq. (8)}$$

As noted above, in some examples, a clipping function may be applied to the reconstructed sample to ensure that it is within a desired dynamic range, which may be expressed as $[0, 2^{bitDepth}-1]$ for a given bitdepth. In the example of 8 bpc, the clipping function may limit the output of the subtractor to [0, 7].

Accordingly, as described above, through the use of appropriate quantization band size and added bias, the image compression and storage system 10 ensures (e.g., guarantees) non-negative and bounded error on the reconstructed images, which can improve the performance of the overdrive system 20.

In addition to ensuring a bounded, non-negative reconstruction error, it is desirable, according to some embodiments, for certain gray levels (e.g., gray value of zero) to be zero or at least smaller than the error of other gray values. For example, for a color depth of three, a gray value may range from 0 to 7. In some examples, the overdrive compensation may place greater importance (higher priority) on gray values as the value drops from 7 to 0, with 0 having the greatest importance (highest priority). In such examples, high reconstruction error may be acceptable for low priority gray values such as 5, 6, and 7. This is contrary to codecs of the related art in which all gray levels are treated equally, and reconstruction error is independent of the amplitude (or gray level) of the pixel samples.

According to some embodiments, the image compression and storage system 10 is configured to ensure smaller reconstruction error for an important gray value, and non-negative reconstruction error on the other gray levels. In some embodiments, the encoder modifies the original gray values in order to achieve lower error for certain gray levels. This may come at the cost of higher-error on other non-important gray levels.

Figure 5A:
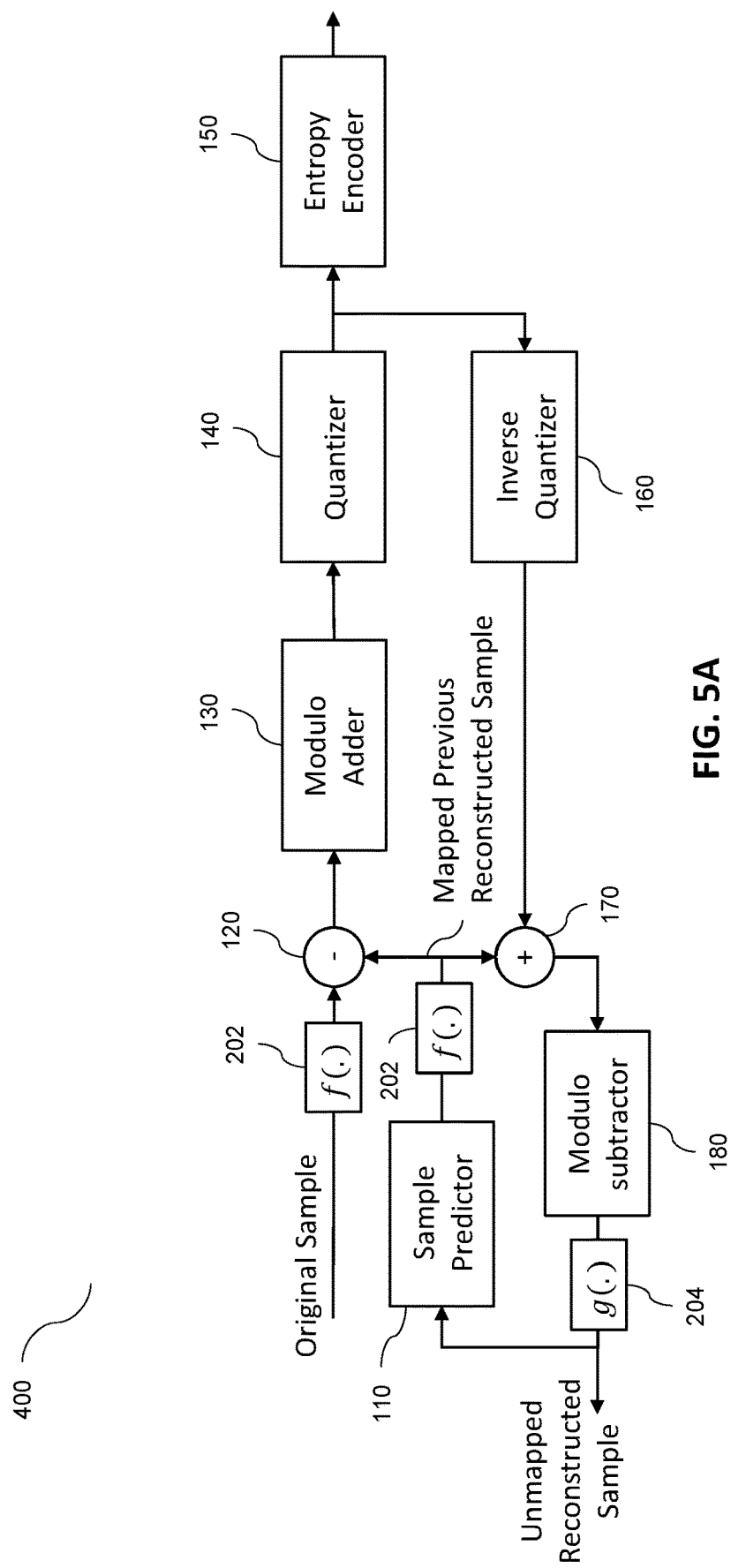
FIG. 5A is a schematic diagram of an encoder with in-loop mapping, according to some embodiments of the present disclosure.
Figure 5B:
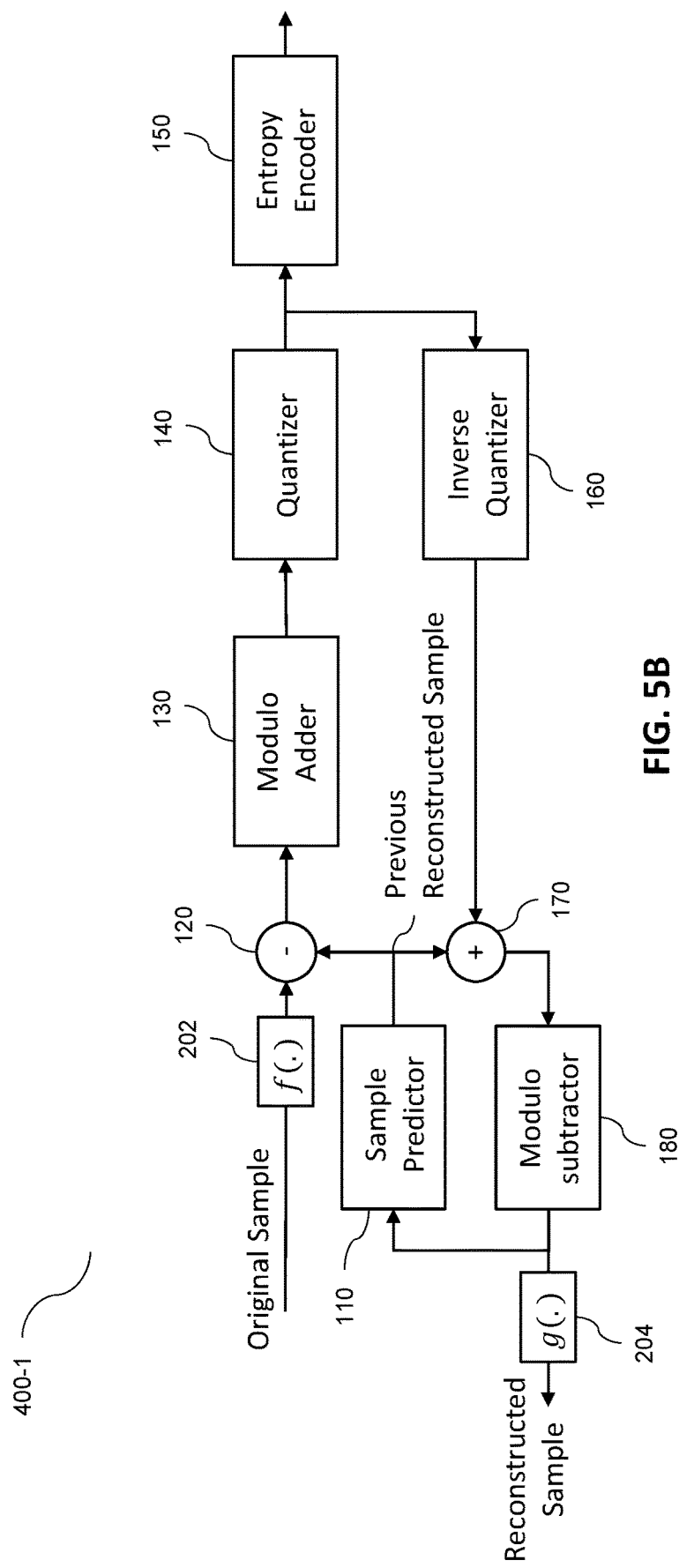
FIG. 5B is a schematic diagram of an encoder with offline/outer-loop mapping, according to some embodiments of the present disclosure.
Figure 6A:
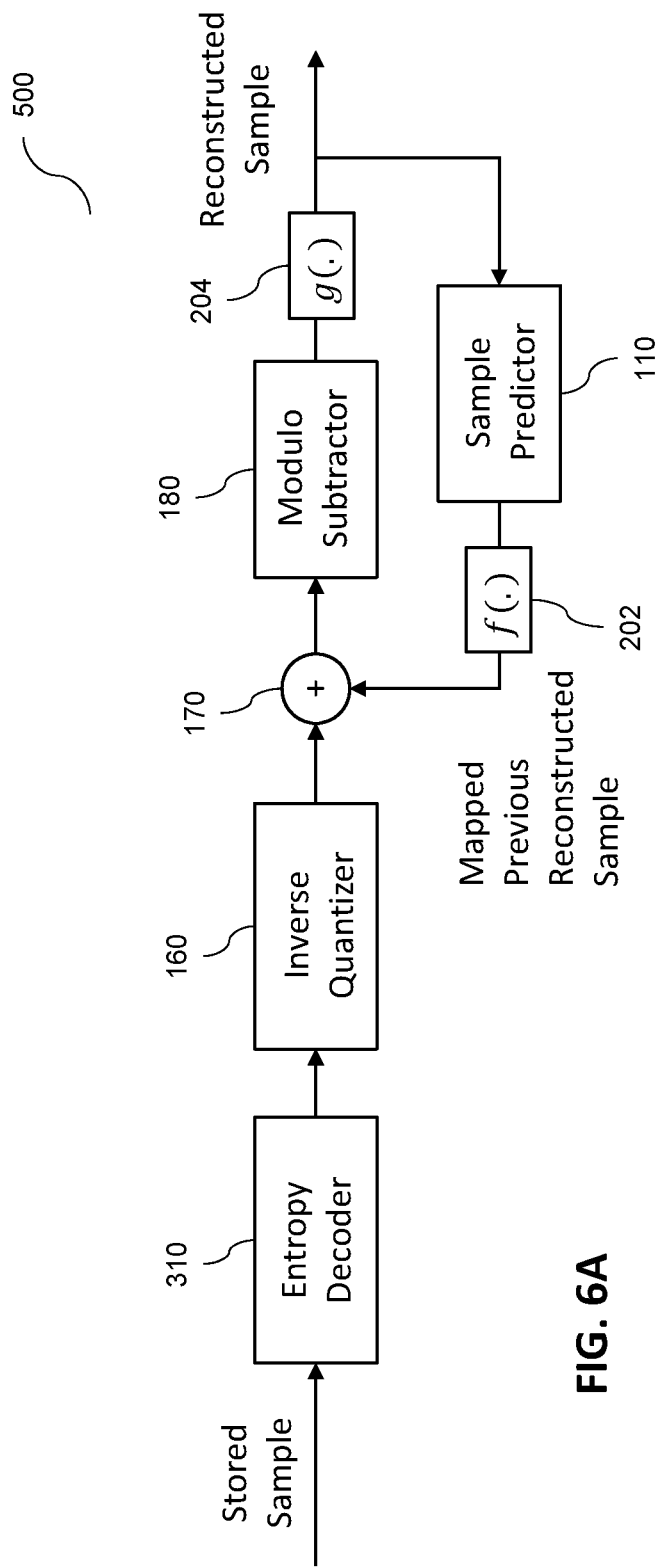
FIGS. 6A-6B are schematic diagrams of a decoder with in-loop mapping and a decoder with offline/outer-loop mapping, respectively, according to some embodiments of the present disclosure.
Figure 6B:
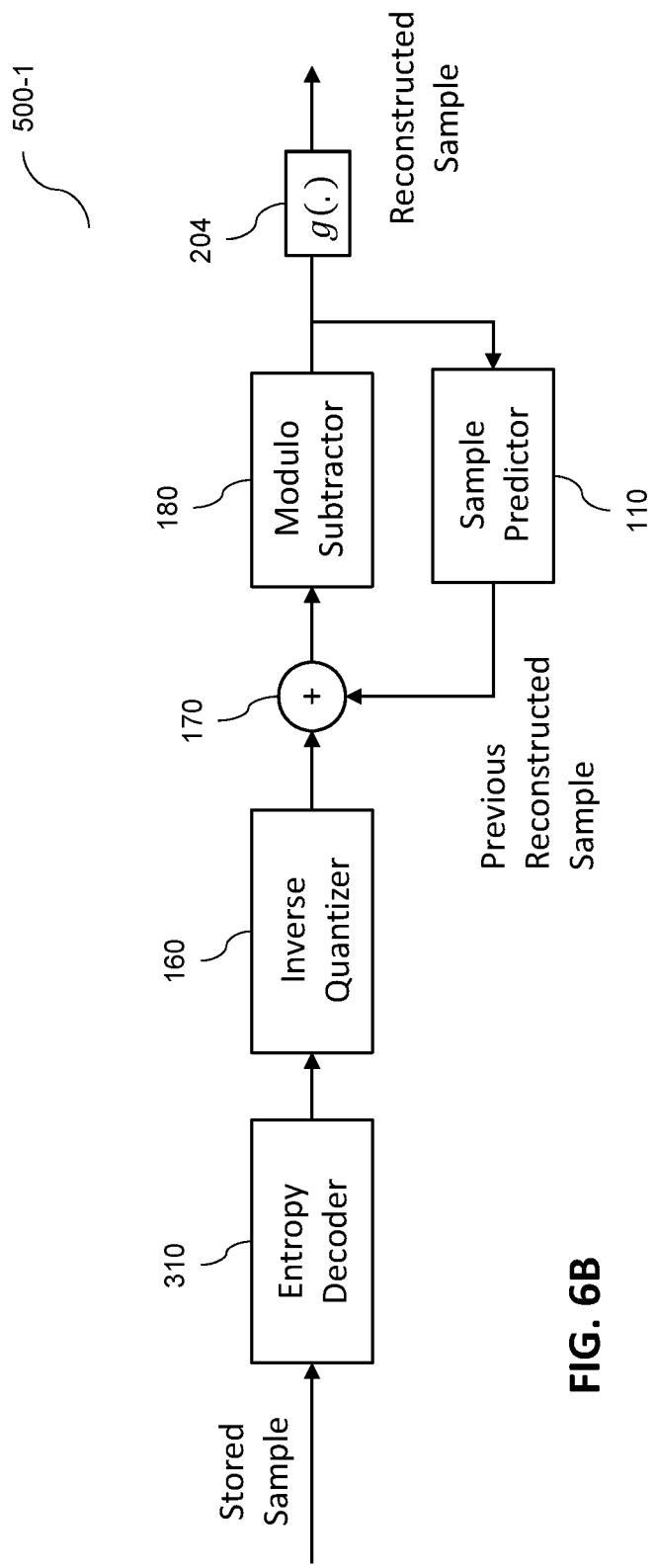

FIG. 5A is a schematic diagram of an encoder 400 with in-loop mapping, according to some embodiments of the present disclosure. FIG. 5B is a schematic diagram of an encoder 400-1 with offline/outer-loop mapping, according to some embodiments of the present disclosure. FIGS. 6A-6B are schematic diagrams of a decoder 500 with in-loop mapping and a decoder 500-1 with offline/outer-loop mapping, respectively, according to some embodiments of the present disclosure.

According to some embodiments, the encoder 400/400-1 includes a mapper (e.g., a gray value mapping circuit) 202 that maps the gray value x of the original sample to a mapped value (also referred to as a mapped sample) f(.) prior to encoding, and further includes an inverse mapper (e.g., an inverse gray value mapping circuit) 204 that performs the inverse operation g(.) of the mapper 202. Thus, the encoder 400/400-1 encodes the original sample in the mapped space, and not the signal space. Here, the dynamic range of the mapped space may be the same as that of the original space. In other words, the bit depth of the mapped and original space may be the same.

According to some embodiments, in the in-loop implementation illustrated in FIG. 5A, the encoder 400 includes a first mapper 202 that operates on the original sample before the adder 170, a second mapper 202 that operates on the sample predictor 110, and further includes an inverse mapper 204 operating on the output of the modulo subtractor. In these embodiments, the inverse mapper 204 performs an inverse mapping operation on the mapped reconstructed sample generated by the modulo subtractor 180 and generates an unmapped reconstructed sample, which is used by the sample predictor 110 to produce a prediction of an unmapped previous reconstructed sample. The second mapper 202 maps this value to a mapped previous reconstructed sample for subtraction from the mapped sample at the subtractor 120.

In some embodiments, in the offline/outer-loop implementation illustrated in FIG. 5A, the inverse mapper 204 does not operate on the input of the sample predictor 110, and as such, no second mapper 202 need operate on the output of the sample predictor 110. In such embodiments, the mapping operation is performed entirely outside of the encoder loop. This outer-loop implementation may be easier to utilize with existing codec, as the operations of the mappers 202 and 204 are performed externally to the codec. Further, the outer-loop implementation has lower complexity as compared to the in-loop implementation, as fewer operations/calculations are performed. However, the in-loop implementation may result in greater performance.

As illustrated in FIGS. 6A-6B, the decoder 500 for an in-loop mapping implementation utilizes both the mapper 202 and the inverse mapper 204 similar to the encoder 400, and the decoder 500-1 for an offline mapping implementation utilizes a single mapper 202 (without the need for an inverse mapper) similar to the encoder 400-1.

In either implementation, the encoder 400/400-1 includes the same components, having the same configuration, as the encoder 100, with the exception of the mapper 202 and inverse mapper 204. Similarly, in both the in-line and off-line implementations, the decoder 500/500-1 includes the same components, having the same configuration, as the decoder 300, with the exception of the mapper 202 and inverse mapper 204. As such, the description of elements in the encoder 400/400-1 and the decoder 500/500-1 that are in common with the encoder 100 and the decoder 300, respectively, will not repeated here for sake of brevity. While the modulo adder 130, the quantizer 140, the inverse quantizer 160, and the modulo subtractor 180 ensure a bounded non-negative reconstruction error, the encoders 400 and 400-1 and the decoders 500 and 500-1 are not limited thereto. For example, when negative reconstruction errors can be tolerated (e.g., by the overdrive system 20), any suitable modulo adder, quantizer, inverse quantizer, and modulo subtractor may be used.

According to some embodiments, when a gray level of 0 is important (e.g., when a reconstruction error of 0 is desired), the mapping function $f(.)$ of the mapper 202 is expressed as:

$$f(x) = \begin{cases} 0 & x = 0 \\ \min(x + \delta - c, maxVal) & 1 \leq x \leq maxVal \end{cases} \quad \text{Eq. (9)}$$

where $\delta$ represents the maximum positive error between the reconstructed sample and original sample, c is a constant non-negative integer that is less than $\delta$ (i.e., $c<\delta$), and maxVal is a maximum value of the mapper input sample (e.g., original sample) x for a given bit depth (or bits per color), which can be expressed as:

$$maxVal = 2^{bitdepth} - 1 \quad \text{Eq. (10)}$$

Further, the inverse mapping function $g(.)$ of the inverse mapper 204 may be expressed as:

$$g(x') = \begin{cases} \text{Clip}(0, maxVal, x' - \delta + c) & 0 \leq x' < maxVal \\ maxVal & x' = maxVal \end{cases} \quad \text{Eq. (11)}$$

where x' represents the input to the inverse mapper 204 (e.g., a mapped reconstructed sample output by the modulo subtractor 180), Clip(0, maxVal, x'−δ+c) is a clipping function that limits the output value x'−δ+c to a minimum of 0 and a maximum of maxVal. In other words, the clipping function yields zero for all values of x'−δ+c that are less than zero, yields maxVal for all values of x'−δ+c that are greater than maxVal, and yields x'−δ+c otherwise.

As will be explained below, when the constant c=0, there is no reconstruction error at the original sample value of 0, although this may come at the cost of increasing error for other original sample values beyond the maximum error $\delta$.

Figure 7A:
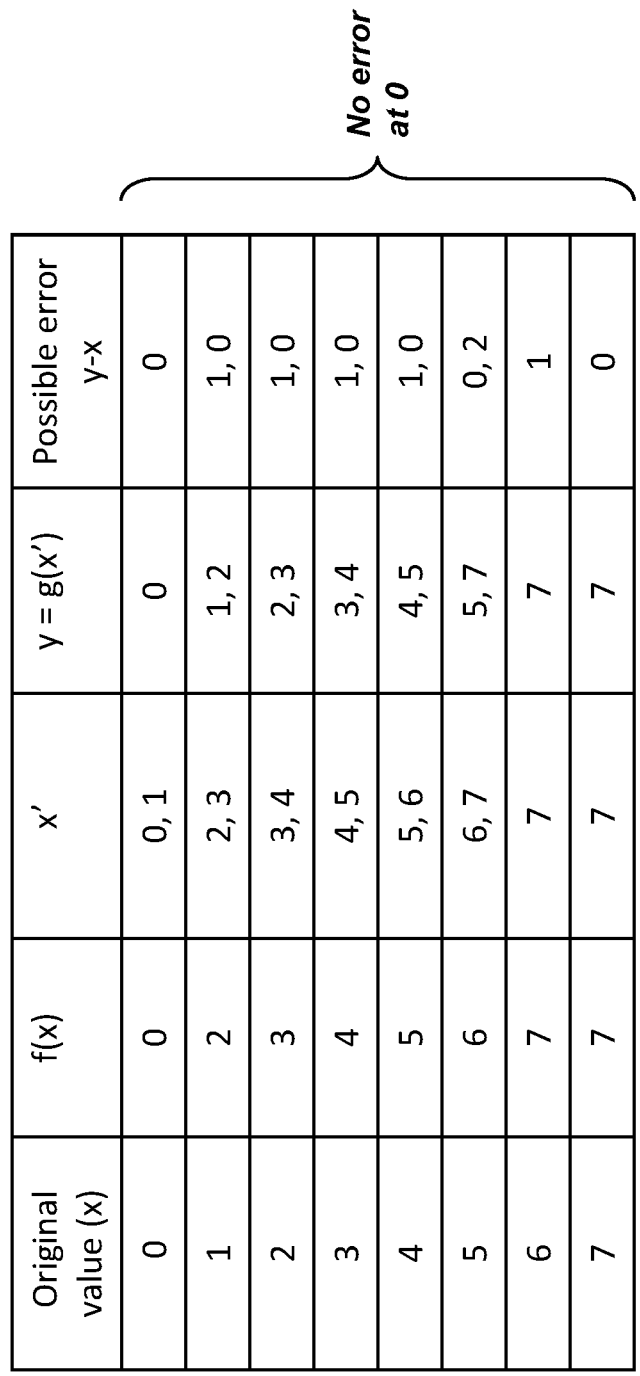

FIGS. 7A-7B are tables illustrating numerical examples of the potential reconstruction errors for different sample values given different values of maximum error $\delta$ and constant c, according to some embodiments of the present disclosure. In the tables illustrated in FIG. 7A-7B, the value x' represents the possible output of the modulo subtractor 180 in the in-line implementation of the encoder 400 (of FIG. 5A), and y represents the reconstructed sample at the output of the inverse mapper 204.

In FIG. 7A, it is assumed that the bit depth is 3 (i.e., the original sample values range from 0 to 7), the maximum error $\delta=1$ and the constant c=0. In this table, the value x' for each value of x may have one or more possibilities depending on the predicted reconstructed sample. For example, in the case of x=3 and f(x)=4, a number of scenarios may be possible: 1) when the sample predictor 110 predicts a value of 3, the residue e' is 1 (=4-3), the quantization index=1, the output of the inverse quantizer 160 (R)=2, the output of the modulo subtractor 180 (x')=5 (=3+2), which yields a reconstructed value y=4; 2) when the sample predictor 110 predicts a value of 2, residue e'=2 (=4−2), quantization index=1, R=2, x'=4 (=2+2), which yields a reconstructed value y=3; and 3) when the sample predictor 110 predicts a value of 5, residue e'=−1 (=4−5), the quantization index=0, R=0, x'=5 (=0+5), which again yields a reconstructed value y=4.

As is apparent from FIG. 7A, with a constant c=0, the reconstructed error for the original sample of 0 (e.g., the most important sample value, statistically) is zero. However, the error for original sample 5 (e.g., a low priority sample) may reach 2, which is greater than the maximum desirable error $\delta$ of 1.

In FIG. 7B, it is assumed that the bit depth is 3, the maximum error $\delta=2$ and the constant c=1. Here, with a constant c greater than zero, the possible reconstruction error for an original sample of 0 is no longer guaranteed to be zero; however, the maximum error at original sample 0 is still lower than or the same as that of other original sample values.

According to some embodiments, when a gray level of i>0 is important, the mapping function $f(.)$ of the mapper 202 is expressed as:

$$f(x) = \begin{cases} 0 & x = i \\ \min(x + 1 + \delta - c, maxVal) & 0 \leq x < i, \\ \min(x + \delta - c, maxVal) & i < x \leq maxVal \end{cases} \quad \text{Eq. (12)}$$

And the inverse mapping function $g(.)$ of the inverse mapper 204 may be expressed as:

$$g(x') = \begin{cases} i & 0 \leq x' \leq \delta + c \\ \text{Clip}(0, maxVal, x' - \delta + c - 1) & \delta + c < x' \leq i + \delta - c \\ \text{Clip}(0, maxVal, x' - \delta + c) & i + \delta - c < x' < maxVal \\ x' & x' = maxValue \end{cases} \quad \text{Eq. (13)}$$

FIG. 8 is a table illustrating a numerical example of the potential reconstruction errors for different sample values given the importance of a non-zero sample value, according to some embodiments of the present disclosure.

In the example of FIG. 8, it is assumed that the bit depth is 3, the maximum error δ=1 and the constant c=0. In this example, the original sample 4 may have been statistically more important to the overdrive system 20, and the reconstruction error for this sample is zero. However, this has come at the cost of greater-than-desired maximum error for original samples 3 and 5.

In the tables of FIGS. 7A-7B and 8, the encoder 400/400-1 and decoder 500/500-1 ensure a non-negative reconstruction error. However, in examples in which negative reconstruction error may be tolerated (e.g., embodiments that utilize any suitable modulo adder/subtractor and quantizer/inverse quantizer, and not necessarily those of the encoder 400/400-1 and decoder 500/500-1), and the most important original value is zero, the mapping function F(.) and inverse mapping function G(.), which may replace the functions f(.) and g(.), may be expressed as:

$$F(x) = \text{maxVal} - x \qquad \text{Eq. (14)}$$

$$G(x') = \begin{cases} \text{maxVal} - x' & x' = \text{maxVal} \\ \text{Clip}(0, \text{maxVal}, \text{maxVal} + 1 - t) & \text{otherwise} \end{cases} \qquad \text{Eq. (15)}$$

In such examples, the mapping function F(.) and inverse mapping function G(.)
may alternatively be expressed as:

$$F(x) = \begin{cases} \text{maxVal} & x = 0 \\ x - 1 & 1 \le x \le \text{maxVal} - 1 \\ x - 2 & x = \text{maxVal} \end{cases} \qquad \text{Eq. (16)}$$

$$G(x') = \begin{cases} 0 & x' = \text{maxVal} \\ x' + 1 & \text{otherwise} \end{cases} \qquad \text{Eq. (17)}$$

FIG. 9A is a table illustrating a numerical example of the potential reconstruction errors for different sample values based on the mapping and inverse mapping functions of Equations of 9-10, according to some embodiments of the present disclosure. FIG. 9B is a table illustrating a numerical example of the potential reconstruction errors for different sample values based on the mapping and inverse mapping functions of Equations of 11-12, according to some embodiments of the present disclosure. In the tables of FIGS. 9A-9B, it is assumed that the bit depth=3 and the maximum error δ=1. Here, the original sample 0 is the most important from the perspective of the overdrive system 20, and the reconstruction for this sample is zero in both tables.

Generally, in the image/video coders of the related art, such as DSC and DPCM, do not place any particular importance on a specific gray value. Therefore, magnitude of reconstruction error is generally independent of the gray value. Further, transform coding used in codecs such as HEVC, JPEG-2000, and VDC-M is not suitable to meet non-negative error as quantization is applied on the transform coefficients in the related art, and positive error in transformed domain does not imply positive error in the signal space.

In contrast, according to some embodiments of the present disclosure, the image storage and compression system affords higher priority to certain gray values, and exhibits lower reconstruction error for such gray values. This may be achieved by performing a pixel-wise mapping of the original image to another space and compressing the images in the mapped space. In addition to maintaining lower error for important gray levels, in some embodiments, the encoder and decoder of the image storage and compression system ensure non-negative error for reconstructed images, which may improve the performance of the corresponding overdrive system.

The operations performed by the constituent components of the encoder 100/400/400-1 and the decoder 300/500/500-1 may be performed by a "processing circuit" or "processor" that may include any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed wiring board (PWB) or distributed over several interconnected PWBs. A processing circuit may contain other processing circuits; for example, a processing circuit may include two processing circuits, an FPGA and a CPU, interconnected on a PWB.

It will be understood that, although the terms "first", "second", "third", etc., may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section, without departing from the scope of the inventive concept.

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "include", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Further, the use of "may" when describing embodiments of the inventive concept refers to "one or more embodiments of the inventive concept". Also, the term "exemplary" is intended to refer to an example or illustration.

As used herein, the terms "use", "using", and "used" may be considered synonymous with the terms "utilize", "utilizing", and "utilized", respectively.

For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ.

Further, the use of "may" when describing embodiments of the inventive concept refers to "one or more embodiments of the inventive concept." Also, the term "exemplary" is intended to refer to an example or illustration.

While this disclosure has been described in detail with particular references to illustrative embodiments thereof, the embodiments described herein are not intended to be exhaustive or to limit the scope of the disclosure to the exact forms disclosed. Persons skilled in the art and technology to which this disclosure pertains will appreciate that alterations and changes in the described structures and methods of assembly and operation can be practiced without meaningfully departing from the principles, and scope of this disclosure, as set forth in the following claims and equivalents thereof.

What is claimed is:

1. A method of compressing a frame in an image compression and storage system, the method comprising:
    applying a modulo addition to a residue of an original sample of the frame to generate a biased residue based on a bit depth of the original sample and a maximum allowed error;
    quantizing the biased residue based on a quantization step size that is equal to the maximum allowed error plus 1 to generate a quantized biased residue; and
    encoding a value corresponding to the quantized biased residue to generate an encoded value that has a non-negative reconstruction error.

2. The method of claim 1, wherein the applying the modulo addition to the residue comprises calculating the biased residue as $$e' = \begin{cases} e & e \geq -\delta \\ e + 2^{bitdepth} + \delta & e < -\delta \end{cases}$$

where e' represents the biased residue, e represents the residue of the original sample, bitdepth represents the bit depth of the original sample, and $\delta$ represents the maximum allowed error,
    wherein the original sample corresponds to a color value of a pixel of the frame.

3. The method of claim 2, wherein the biased residue is within a range expressed as $-\delta \leq e' \leq 2^{bitdepth}-1$.

4. The method of claim 1, further comprising:
    receiving the original sample; and
    subtracting a prediction of a previous reconstructed sample from the original sample to generate the residue of the original sample.

5. The method of claim 1, wherein the value corresponding to the quantized biased residue is a quantization index corresponding to the quantized biased residue.

6. The method of claim 1, wherein the quantizing the biased residue comprises calculating a quantization index of the quantized biased residue as:

$$I[e'] = \text{Ceiling}\left(\frac{e'}{\delta+1}\right)$$

where I[e'] represents the quantization index, Ceiling(.) represents a ceiling function, e' represents the biased residue, and $\delta$ represents the maximum allowed error.

7. The method of claim 1, wherein the quantizing the biased residue comprises utilizing non-uniform quantization bands.

8. The method of claim 1, further comprising:
    performing inverse quantization on the quantized biased residue to generate a reconstructed biased residue; and
    adding a prediction of a previous reconstructed sample to the reconstructed biased residue to generate a reconstructed biased sample;
    applying a modulo subtraction and a clipping operation to the reconstructed biased sample based on the bit depth of the original sample and the maximum allowed error to generate a reconstructed sample; and
    generating the prediction of a subsequent reconstructed sample based on the reconstructed sample.

9. The method of claim 8, wherein the applying the modulo subtraction to the reconstructed biased sample comprises calculating the reconstructed sample as:

$$y = x - (2^{bitdepth} + \delta)$$

where y represents the reconstructed sample, x represents the reconstructed biased sample, bitdepth represents the bit depth of the original sample, and $\delta$ represents the maximum allowed error.

10. The method of claim 8, wherein the performing inverse quantization is based on a quantization band size that is equal to the maximum allowed error and further based on a quantization index.

11. The method of claim 8, wherein the performing inverse quantization on the quantized biased residue comprises calculating the reconstructed biased residue as $$Q[e'] = (\delta+1)I[e']$$

where Q(e') represents the reconstructed biased residue associated with the biased residue e', I[e'] represents a quantization index, and $\delta$ represents the maximum allowed error.

12. The method of claim 1, wherein the performing inverse quantization on the quantized biased residue is based on a non-uniform quantization table.

13. The method of claim 1, wherein the encoding the value corresponding to the quantized biased residue comprises:
    performing entropy encoding on the value corresponding to the quantized biased residue to generate the encoded value.

14. The method of claim 1, further comprising:
    truncating the frame by reducing a bit depth of a color value of a pixel of the frame to generate the original sample,
    wherein the frame has a red, green, and blue (RGB) format or a red, green, blue, and green (RGBG) format.

15. A method of decompressing stored image data corresponding to a frame in an image compression and storage system, the method comprising:
    decoding an encoded value corresponding to an original sample of the frame to generate a decoded value corresponding to a quantized biased residue;
    performing inverse quantization on the decoded value based on a maximum allowed error plus 1 to generate a reconstructed biased residue;
    adding a prediction of a previous reconstructed sample to the reconstructed biased residue to generate a reconstructed biased sample; and
    applying a modulo subtraction to the reconstructed biased sample based on a bit depth of the original sample and the maximum allowed error to generate a reconstructed sample.

16. The method of claim 15, further comprising:
generating the prediction of a subsequent reconstructed sample based on the reconstructed sample.

17. The method of claim 15, wherein the applying the modulo subtraction to the reconstructed biased sample comprises calculating the reconstructed sample as:

$$y = x - (2^{bitdepth} + \delta)$$

where y represents the reconstructed sample, x represents the reconstructed biased sample, bitdepth represents the bit depth, and $\delta$ represents the maximum allowed error.

18. The method of claim 15, wherein the decoded value is a quantization index, and
wherein the performing inverse quantization on the decoded value comprises calculating the reconstructed biased residue as $$Q[e'] = (\delta+1)I[e']$$

where Q(e') represents the reconstructed biased residue, I[e'] represents the quantization index, e' represents the biased residue, and $\delta$ represents the maximum allowed error.

19. An image compression and storage system comprising:
a processor; and
a processor memory local to the processor, wherein the processor memory has stored thereon instructions that, when executed by the processor, cause the processor to perform:
applying a modulo addition to a residue of an original sample of a frame to generate a biased residue based on a bit depth of the original sample and a maximum allowed error;
quantizing, by the processor, the biased residue based on a quantization step size that is equal to the maximum allowed error plus 1 to generate a quantized biased residue;
encoding a value corresponding to the quantized biased residue to generate an encoded value for storage in a storage medium;
retrieving the encoded value from the storage medium;
decoding the encoded value to generate a decoded value corresponding to a quantized biased residue;
performing inverse quantization on the decoded value to generate a reconstructed biased residue;
adding a prediction of a previous reconstructed sample to the reconstructed biased residue to generate a reconstructed biased sample; and
applying a modulo subtraction to the reconstructed biased sample based on the bit depth of the original sample and the maximum allowed error to generate a reconstructed sample,
wherein a difference between the original sample and the reconstructed sample is only non-negative.

* * * * *